United States Patent [19]
Rishe et al.

[11] Patent Number: 5,920,857
[45] Date of Patent: Jul. 6, 1999

[54] EFFICIENT OPTIMISTIC CONCURRENCY CONTROL AND LAZY QUERIES FOR B-TREES AND OTHER DATABASE STRUCTURES

[75] Inventors: Naphtali David Rishe; Artyom Shaposhnikov, both of Miami, Fla.

[73] Assignee: Naphtali Rishe, Miami, Fla.

[21] Appl. No.: 08/905,679

[22] Filed: Aug. 4, 1997

[51] Int. Cl.$^6$ ..................................................... G06F 17/30
[52] U.S. Cl. ................ 707/3; 707/2; 707/8; 395/200.33; 395/200.43
[58] Field of Search ........................... 707/1–4, 100–102, 707/200–203, 8; 395/200.3, 200.31, 200.33, 200.43, 200.45; 711/129, 120

[56] References Cited

U.S. PATENT DOCUMENTS

| | | |
|---|---|---|
| 5,247,672 | 9/1993 | Mohan . |
| 5,263,156 | 11/1993 | Bowen et al. . |
| 5,485,607 | 1/1996 | Lomet et al. . |
| 5,806,065 | 9/1998 | Lomet ......................................... 707/8 |

OTHER PUBLICATIONS

A. Adya, R. Gruber, B. Liskov, U. Masheshwari. "Efficient Optimistic Concurrency Control Using Loosely Synchronized Clocks," SIGMOD Record, Jun. 1995, v 24 n. 2, pp. 23–34.

D. Comer. "The Ubiquitous B–Tree," ACM Computing Surveys, Jun. 1979, v11 n. 2.

J. Gray. "Notes on Database Operating Systems" in R. Bayer, R. Graham, And G. Seegmuller. Operating Systems; An Advanced Course, pp. 394–481, Spring–Verlag, 1979.

T. Haerder. "Observations on Optimistic Concurrency Control," Information Systems, Jun. 1984, v 9 n. 2, pp. 111–120.

N. Rishe, A. Shaposhnikov, S. Graham. "Load Balancing in a Massively Parallel Semantic Database" to appear in the International Journal of Computer Science and Engineering. Jul., 1996.

N. Rishe. Database Design: The Semantic Modeling Approach. MacGraw–Hill, 1992, 528.

N. Rishe. "A File Structure for Semantic Databases," Information Systems, v 16 n. 4, 1991, pp. 375–385.

N. Rishe. "Interval–based approach to lexicographic representation and compression of numeric data," Data & Knowledge Engineering, n 8, 1992, pp. 339–351.

*Primary Examiner*—Thomas G. Black
*Assistant Examiner*—Hosain T. Alam
*Attorney, Agent, or Firm*—Jones & Askew, LLP

[57] ABSTRACT

The present invention relates to a system and methods for fine-granularity concurrency control in a parallel database. Very fine granularity (at the level of B-tree records) is implemented in a B-tree. Our method applies to B-trees, B-trees with variable keys, and their applications, such as semantic and object-oriented databases. Our method involves accumulating a transaction and then "optimistically" validating it, while attaining high efficiency with maximum semantic safety. "Lazy queries"—an efficient method for finding the intersection of two large queries—is provided for the system.

8 Claims, 2 Drawing Sheets

EFFICIENT OPTIMISTIC CONCURRENCY CONTROL AND LAZY QUERIES FOR B-TREES AND OTHER DATABASE STRUCTURES

BACKGROUND OF THE INVENTION

This invention relates to a system and method for guaranteeing consistent and efficient access to a database management system. More particularly, it relates to a fine granularity optimistic concurrency control method and a query optimization technique for parallel B-trees.

Finer granularity increases concurrency by reducing contention among transactions. There is a significant body of prior art relating to fine granularity concurrency control. U.S. Pat. No. 5,247,672 "Transaction processing system and method with reduced locking" describes a transaction processing system that reduces the number of page locks and permits to use finer granularity for transactions that read large quantities of data. U.S. Pat. No. 5,485,607 "Concurrency-control and apparatus in a database management system utilizing key-valued locking" describes a new pessimistic concurrency control scheme that improves concurrency by utilizing an expanded set of lock modes that permit locks on the key values.

In prior art, fine granularity required a large amount of computational resources to perform the conflict detection, and, therefore, optimistic concurrency control algorithms available today sacrifice granularity to improve the overall server performance. U.S. Pat. No. 5,263,156 "Parallel, distributed optimistic concurrency control certification using hardware filtering" describes a system which offers a hardware solution to cope with high computational overhead of conflict detection in an optimistic concurrency control protocol.

BRIEF SUMMARY OF THE INVENTION

In this invention we propose an efficient optimistic concurrency control method for B-trees. The concurrency control method proposed in this invention allows to accumulate the transactions at the user machines and to perform most processing at the user machines. This allows us to reduce the computational load for the servers and implement a very fine granularity, thus improving the overall server performance. This invention also proposes to use logical clocks in optimistic concurrency control protocol, eliminating the need to use synchronized physical clocks in conflict detection.

A frequently executed query in databases is to find an intersection of several other queries. For example, a library database user may need to retrieve all papers that have certain keywords. The simplest way to execute the intersection query is to actually execute all sub-queries and then find the intersection of these sub-queries. The problem arises when one or several sub-queries are very large, while the final result is small—the straightforward algorithm is inefficient because of the large computational and memory load necessary to store the intermediate results. A number of query optimization techniques that use statistical knowledge about the data are known. For example, if one of the sub-queries is likely to produce a small output, it makes sense to retrieve this query first, and then obtain the intersection by simply checking the membership predicate of the final set for each member of the small sub-query. The present invention proposes a method called "lazy queries" to find the intersection of the sub-queries in a very efficient way, which does not require full execution of large sub-queries nor does it require any statistical knowledge about the data.

These methods are applied to a parallel B-tree with variable length keys and a semantic binary database system. Our method also applies to B-trees with fixed keys and their applications, such as object-oriented databases.

BRIEF DESCRIPTION OF THE DRAWINGS

The improvement of the present invention and its advantages will become more apparent from the description in the next section of the preferred embodiment in which.

DETAILED DESCRIPTION OF THE INVENTION

Definitions

Figure 1:
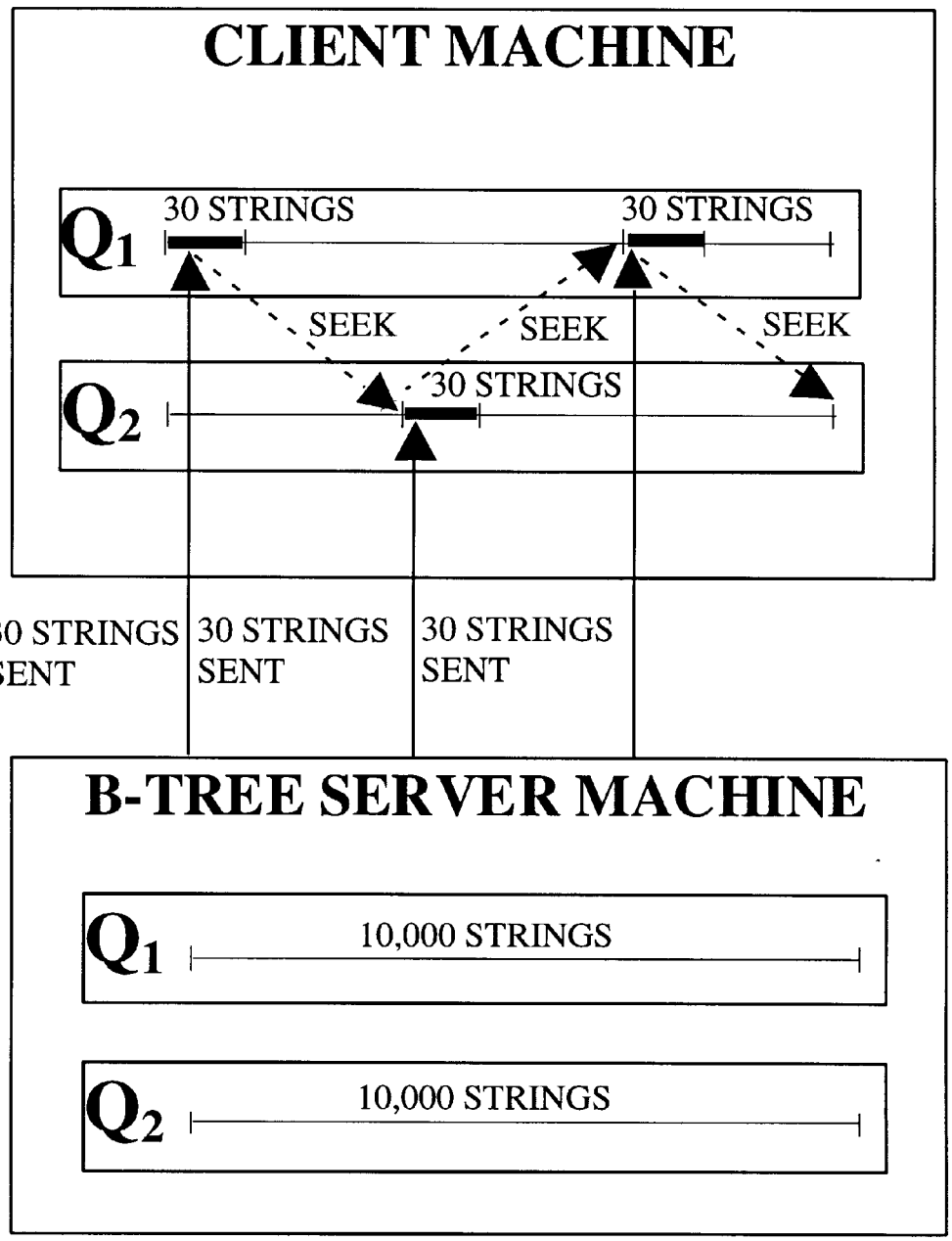
FIG. 1 shows the execution of two lazy queries and demonstrating its typical optimization that reduces the server traffic from 20,000 strings to just 90 strings after optimization.

B-tree is a data type that stores a large number of database records (strings). B-tree interface allows its users to insert, delete, and retrieve a number of strings. For example, a B-tree can be a data type defined as a lexicographically ordered set of strings with the following operations:

1. Elementary query (interval) operator $[l, r]$, where $l$ and $r$ are arbitrary strings.

$[l, r]S = \{x \in S | l \leq x \leq r\}$, where $\leq$ is the lexicographic order of strings.

2. Update operator. Let $D$ and $I$ be two sets of strings:

$S+(I,D)=(S-D) \cup I$ (i.e., we remove a set of strings $D$ and insert a set $I$ instead).

Query Optimization

We will demonstrate the benefits of our query optimization method by applying it to a semantic object-oriented database.

Introduction to Semantic DBMS

The semantic database models in general, and the Semantic Binary Model SBM ([Rishe-92-DDS] and others) in particular, represent the information as a collection of elementary facts categorizing objects or establishing relationships of various kinds between pairs of objects. The central notion of semantic models is the concept of an abstract object. This is any real world entity about which we wish to store information in the database. The objects are categorized into classes according to their common properties. These classes, called categories, need not be disjoint, that is, one object may belong to several of them. Further, an arbitrary structure of subcategories and supercategories can be defined. The representation of the objects in the computer is invisible to the user, who perceives the objects as real-world entities, whether tangible, such as persons or cars, or intangible, such as observations, meetings, or desires.

The database is perceived by its user as a set of facts about objects. These facts are of three types: facts stating that an object belongs to a category; facts stating that there is a relationship between objects; and facts relating objects to data, such as numbers, texts, dates, images, tabulated or analytical functions, etc. The relationships can be of arbitrary kinds; for example, stating that there is a many-to-many relation address between the category of persons and texts means that one person may have an address, several addresses, or no address at all.

Logically, a semantic database is a set of facts of three types: categorization of an object denoted by xC; relationship between two objects denoted by xRy; and relationship between an arbitrary object and a value denoted by xRv. Efficient storage structure for semantic models has been proposed in [Rishe-91-FS].

The collection of facts forming the database is represented by a file structure which ensures approximately one disk access to retrieve any of the following:

1. For a given abstract object x, verify/find to which categories the object belongs.

2. For a given category, find its objects.

3. For a given abstract object x and relation R, retrieve all y such that xRy.

4. For a given abstract object y and relation R, retrieve all abstract objects x such that xRy.

5. For a given abstract object x, retrieve (in one access) all (or several) of its categories and direct and/or inverse relationships, i.e. relations R and objects y such that xRy or yRx. The relation R in xRy may be an attribute, i.e. a relation between abstract objects and values.

6. For a given relation (attribute) R and a given value v, find all abstract objects such that xRv.

7. For a given relation (attribute) R and a given range of values $[v_1, v_2]$, find all objects x and v such that xRv and $v_1 \leq v \leq v_2$.

The operations 1 through 7 are called elementary queries. The entire database can be stored in a single B-tree. This B-tree contains all of the facts of the database (xIC, xRv, xRy) and additional information called inverted facts: CIx, Rvx, and $yR_{inv}x$. (Here, I is the pseudo-relation IS-IN denoting membership in a category.) The inverted facts allow answers to the queries 2, 4, 6, 7 to be kept in a contiguous segment of data in the B-tree and answer them with one disk access (when the query result is much smaller than one disk block). The direct facts xIC and xRy allow answers to the queries 1, 3, and 5 with one disk access. This allows both sequential access according to the lexicographic order of the items comprising the facts and the inverted facts, as well as random access by arbitrary prefixes of such facts and inverted facts. The facts which are close to each other in the lexicographic order reside close in the B-tree. (Notice, that although technically the B-tree-key is the entire fact, it is of varying length and typically is only several bytes long, which is a typical size of the encoded fact xRy.).

Numeric values in the facts are encoded as substrings using the order-preserving variable-length number encoding of [Rishe-91-IB].

Table 1 summarizes how the elementary semantic queries are implemented using the B-tree interval operators. We use notation S+1 to denote a string derived from the original string S by adding 1 to the last byte of S. (For strings encoding abstract objects, this operation never results in overflow.)

TABLE 1

Implementation of elementary queries

| Query | B-tree Implementation |
|---|---|
| 1.x? | [xI,xI + 1] |
| 2.C? | [CI,CI + 1] |
| 3.xR? | [xR,xR + 1] |
| 4.?Rx | [$xR_{inv}$,$xR_{inv}$ + 1] |
| 5.x?? | [x,x + 1] |
| 6.?Rv | [Rv,Rv + 1] |
| 7.R[v1..v2]? | [Rv1,Rv2 + 1] |

For most elementary queries (queries 1, 3, 4, 5, and 6) the number of binary facts is usually small. Some queries (queries 2 and 7), however, may result in a very large number of facts, and it may be inefficient to retrieve the whole query at once.

A common operation in databases is to calculate an intersection of two queries. For example, consider a query: "Find all objects from category Student that have the attribute BirthYear 1980". This query can be executed using several scenarios:

Scenario 1 a. Retrieve all persons born in 1980. Execute an elementary query "BirthYear 1980?"

b. For each person retrieved in the step a verify that the person belongs to the category Student Scenario 2 a. Retrieve all persons born in 1980. Execute an elementary query "BirthYear 1980?"

b. Retrieve all students: execute an elementary query "Student?"

c. Find an intersection of the objects retrieved in a and b.

In Scenario 1 we retrieve all persons from all categories (Person, Instructor, and Student) who were born in 1980, and for each person we execute an additional elementary query to verify that the retrieved person is a student. In this scenario we have to execute a large number of small queries.

In Scenario 2 we execute only two elementary queries and then find an intersection of the results. The problem is that the elementary query "Student?" may result in a very large set of binary facts. Not only is this very inefficient in terms of expensive communication between client and server, but also such a big query would be affected by any transaction that inserts or deletes students. Also our query would be aborted more often than the query in the Scenario 1.

Thus, Scenario 1 is obviously better in our case. Consider now another query: "Find all instructors born in 1970". The number of persons born in 1970 could be larger or comparable with the total number of instructors. In this case, Scenario 2 would be much more efficient because we need to execute only two elementary queries.

Lazy Queries

Our technique of lazy elementary query execution greatly reduces the number of disk accesses, the server traffic, and the transaction conflict probability by automatically reducing one scenario to another. For example, the intersection operator gets a close-to-optimal implementation without keeping any data distribution statistics.

In our B-tree access method, the actual query execution is deferred until the user actually utilizes the query results. We define the elementary lazy query programmatic interface in a B-tree B as follows:

1. $Q:=[l, r]B$—define a lazy query $[l, r]$ but do not execute it yet. Let z be the longest common prefix of the strings l and r. A query result is a set of strings x such that $zx \in B$ and $l \geq zx \geq r$.

2. Let Q.P be a pointer to future results of the query. Initially $Q.P\hat{} :=$ '', i.e. P points to an empty string.

3. $Seek(Q, x)$—moves the pointer Q.P, so that $Q.P\hat{} = \min\{y | zy \in [l, r]B \text{ and } zy \geq x\}$.

Derived from the above are the actual principal operations on the query results:

1. $Read(Q):=Q.P\hat{}$—reads the current string pointed by the logical pointer Q.P. This operation results in an error if Q.P=null.

2. $Next(Q):=Seek(Q, Read(Q)+0)$. We use notation s+0 to denote a string derived from the string s by appending a zero byte, i.e. s+0 is lexicographically the lowest string after s.

When the Seek operation is executed, the string pointed to by the new logical pointer is fetched from the B-tree, and normally a small number of lexicographically close strings are pre-fetched and placed in a lazy query cache buffer. It is likely that the next Seek operation will request a string which is already in the cache buffer, so only a few Seek operations require actual disk and server access.

Many queries can efficiently use the Seek operation. For example, we can very efficiently find the intersection of two lazy queries $Q_1$ and $Q_2$: construct a new lazy query (lazy intersection) $Q_3$ where the Seek operation uses the following algorithm:

```
Q3: = Q1 & Q2
Seek(Q3,x):
    Seek(Q1,x);
    Seek(Q2,x);
    while (Q1.P ≠ null & Q2.P ≠ null &
        Q1.PΛ ≠ Q2.PΛ) do
    if Q1.PΛ > Q2Λ.P then
        Seek(Q2,Q1.PΛ)
    else
        Seek(Q1,Q2.PΛ);
    od;
    if Q1.P = null or Q2.P = null then
        Q3.P: = null
    else
        Q3.P: = Q1.P;
```

This algorithm gives an efficient solution for the sample queries described in the previous section. For the query "Find all objects from category Student that have the attribute BirthYear 1980" we use three lazy queries:

a. $Q_1:=$ elementary lazy query "BirthYear 1980?"
b. $Q_2:=$ elementary lazy query "Student?"
c. $Q_3:=Q_1 \& Q_2$ Since query $Q_3$ is not actually executed, our algorithm that finds intersection will not require retrieving of every student from the database: the number of actual disk accesses to retrieve the students in the query $Q_2$ will be less than or equal to the number of persons born in 1980. Thus, the cost of the lazy query $Q_3$ will be smaller than the cost of the best solution for elementary queries in Scenario 1 described in the previous section.

For the query "Find all instructors born in 1970" we use three similar lazy queries. Since the number of instructors is likely to be small, it is possible that all instructors will be fetched at the first disk access, and the whole query will require a number of server accesses close to 2, which is the optimal number.

FIG. 1 shows execution of two lazy queries $Q_1$ and $Q_2$. Each query contains 10,000 strings at the server machine. A lazy query execution algorithm requires only 3 requests (Seek operations) to the server of 30 strings each, so that the total number of strings retrieved from the server is 90. Without our optimization, it would be necessary to retrieve both queries with size of 20,000 strings from the B-tree server to find the intersection.

Lazy queries can also be used to efficiently subtract a large set of strings $Q_2$ from a another set $Q_1$. The algorithm for subtraction is similar: we retrieve a string from $Q_1$ and use the Seek operation to verify that this string does not belong to $Q_2$.

Lazy queries not only result in a smaller number of server accesses. We will show that lazy queries allow the improvement of the granularity of our concurrency control algorithm and reduce the transaction conflict probability.

Parallel B-tree Structure

A massively parallel B-tree should perform many queries and transactions simultaneously and its size should scale to hundreds of terabytes even if the underlying computer hardware supports only 32 bit addressing. This is achieved by splitting the B-tree into partitions of about 1 gigabyte in size. The whole B-tree is then a network of computers where each computer holds one or more B-tree partitions. The B-tree partitions themselves are indexed by a partitioning map.

Concurrency Control

Our concurrency control algorithm is an optimistic algorithm that first accumulates a transaction, then performs it using a 2-phase commit protocol [Gray-79], and performs a backward validation [Haerder-84] to ensure the serializability and external consistency of transactions. Our algorithm benefits from and improves upon the validation technique of the [Adya&al-95] algorithm for an object-oriented database. Their algorithm uses loosely synchronized physical clocks to achieve global serialization and detects conflicts at the object level granularity. In our algorithm, a finer granularity at the level of strings is attained, and we use logical clocks to achieve global serialization; nevertheless, our algorithm does not require maintaining any extra data per string or per client.

Transaction Accumulation

In a parallel B-tree, updates and queries made by a client should be verified for conflicts with contemporaneous updates and queries made by other B-tree clients. A transaction is a group of B-tree updates and queries which is guaranteed to be consistent with the queries and updates executed concurrently within other transactions. To create such a group of operations we have several B-tree operations in addition to the lazy queries:

1. Insert String x
2. Delete String x
3. Transaction Begin
4. Transaction End

A transaction is the execution of a series of actions between a "Transaction Begin" and "Transaction End". When the Transaction End is executed, all queries and updates made since the Transaction Begin are checked for conflicts with the queries and updates made by concurrent transactions. If there is a conflict, the transaction is aborted and the Transaction End returns an error.

The updates made within a transaction do not change the B-tree immediately. Instead, these updates are accumulated at the client machine in a set of inserted strings I and a set of deleted strings D. The B-tree strings remain unaffected. The insert and delete operations work as follows:

insert(x)={D:=D−{x}; I:=I∪{x}} delete(x)={I:=I−{x}; D:=D∪{x}}

When "Transaction End" is executed, the set D is deleted from the B-tree and the set I is inserted into B-tree:

B:=(B−D)∪I

During the accumulation of a transaction into sets D and I, the client machine also accumulates a set V to be used for backward validation. The set V contains the specification of each subinterval read by a query within the transaction and a timestamp of this reading. A subinterval is a subrange within a query which was physically retrieved from one database partition at one logical moment in time. The logical time at a given database partition is incremented each time when a committed transaction physically changes that partition. The subintervals are stamped with this logical time and a number that identifies the partition in the system. Thus the set V is $\{([l_k, r_k], t_k, p_k)^n_{k=1}\}$, where $t_k$ is the timestamp and $p_k$ is the partition number.

In our validation technique, when committing a transaction T, the system does not need to remember the results of T's queries; it remembers only query specifications [l, r], which are checked against concurrent transactions at T's commit time. The validation is done against transaction queues, normally without any disk access.

Lazy queries can be used to further reduce the validation specified by the set V and improve the granularity in conflict detection. Previous examples have shown that the user does not actually retrieve all facts from the lazy query interval. The intersection of lazy queries uses the Seek operation and retrieves only a few strings from the original elementary queries. A lazy query automatically keeps track of those string subranges that have actually been retrieved by the user. This union of subranges can be much smaller than the union of the original elementary query intervals. This results in a finer transaction granularity and smaller conflict probability. At the end of transaction execution, the string subranges from all lazy queries are further optimized by merging intersecting subranges of all lazy queries. This optimization is done at the client side, which allows us to reduce the server workload and the transaction execution time.

An accumulated transaction is a triple T(I, D, V) of strings to be inserted I, strings to be deleted D, and string intervals V to be verified.

Note that even if no updates were made, a transaction is still necessary to ensure the consistency of queries. Thus, a query can produce an accumulated transaction T(I, D, V) with empty sets D and I.

Validation Method

A validation is necessary to ensure two important properties of transactions: serializability and external consistency. Serializability means that the committed transactions can be ordered in a such a way that the net result would be the same as if transactions ran sequentially, one at a time. External consistency means that the serialization order is not arbitrary: if transaction S was committed before T began (in real time), S should be ordered before T.

When a client commits a transaction, the accumulated transaction T is delivered to one of the database servers. This database server is called the transaction's originator. The transaction originator splits the arriving transaction into subtransactions $T_i$ according to the partitioning map and distributes the subtransactions among the database partitions. A subinterval $([l_k, r_k], t_k, p_k)$ in the set V is distributed to the partition $p_k$ (without consulting the partitioning map). This allows the detection of conflicts with system transactions that perform load balancing, which may change the partitioning map.

The transaction originator uses the 2-phase commit protocol to update the database. In the first phase, the transaction originator distributes the subtransactions among the database partitions. Each database partition verifies that no conflicts with any other transaction is possible and sends a "ready" or "failed" message to the transaction originator. If the transaction originator receives a "failed" message, it immediately aborts the other subtransactions and notifies the client. When all database partitions return a "ready" message, the transaction originator sends a "commit" message to the participating partitions.

In our backward validation protocol, the arriving subtransaction $T_i(I_i, D_i, V_i)$ is checked against all transactions already validated successfully. In our B-tree, each partition maintains a log of recently committed transactions CL and a log of transactions waiting for commit WL.

We say that a set of string intervals V intersects a set of strings A iff there exists an interval [l, r] in V such that [l, r]∩A≠∅ (i.e. for some x∈A:l≤x≤r).

We also say that two transactions $T(I_T, D_T, V_T)$ and $S(I_S, D_S, V_S)$ intersect if:

1. $I_T \cap D_S \neq \emptyset$ or $I_S \cap D_T \neq \emptyset$ or

2. $V_S$ intersects $I_T \cup D_T$ or

3. $V_T$ intersects $I_S \cup D_S$

When the subtransaction $T_i$ arrives, it is verified that $T_i$ intersects with no transaction S in WL.

Additional verification is necessary to ensure that no query in $T_i$ is affected by a recently committed transaction S in CL. We check that each interval $([l_k, r_k], t_k, n_k)$ in $V_i$ of $T_i$ does not intersect with the sets $I_S$ and $D_S$ of any transaction S in CL that has greater timestamp than $t_k$.

If the subtransaction is successfully verified, it is appended to the WL and the "ready" message is sent to the transaction originator. Otherwise the "failed" message is sent to the transaction originator.

Figure 2:
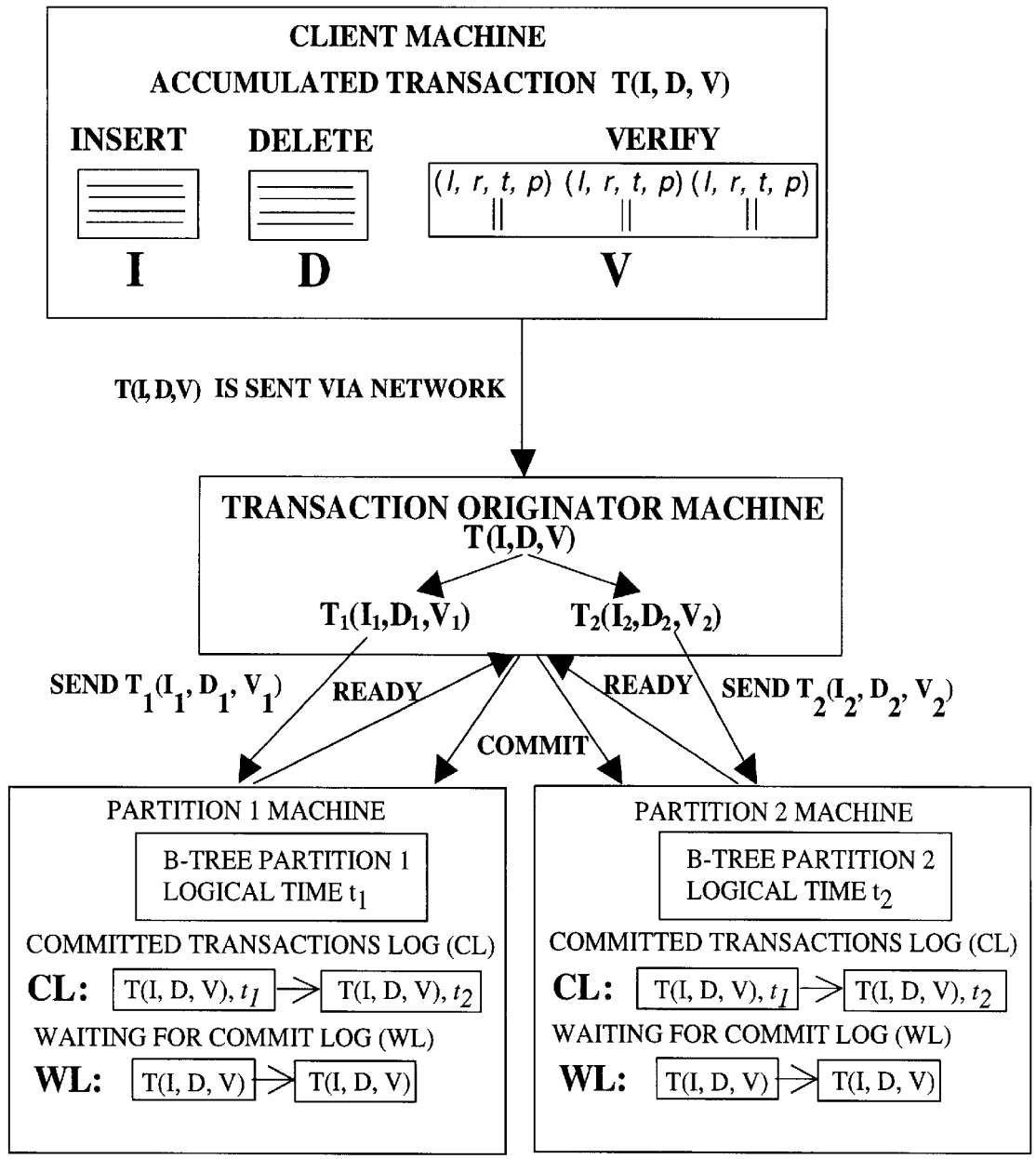
FIG. 2 shows the work of our optimistic concurrency control algorithm with logical timestamps, and novel validation method.

FIG. 2 shows a simple case of transaction accumulation, distribution, and validation when only two B-tree partitions are involved. A client at the Client Machine accumulates a transaction T(I, D, V). When the client decides to commit the transaction, T(I, D, V) is sent via the network to the transaction originator machine. The transaction originator machine splits the transaction into two subtransactions $T_1(I_1, D_1, V_1)$ and $T_2(I_2, D_2, V_2)$ and sends them to the corresponding B-tree partitions machines. Partitions 1 and 2 execute the validation protocol by checking the subtransactions against the committed transactions logs and the waiting for commit logs according to our validation method with logical timestamps. When the verification is done, a Ready message is sent to the transaction originator, which immediately sends the Commit message to the B-tree partitions.

It can be shown that our concurrency control algorithm satisfies both serializability and external consistency requirements.

That which we claim is:

1. A concurrency control method for a multiserver database system comprising multiple server machines and multiple client machines, comprising the steps of:

incrementing a logical time at each server machine during transaction execution at the server machine;

accumulating a transaction T(I, D, V) at a client machine in three sets, an Insert set I, a Delete set D, and a Verify set V,
the Insert set comprising a set of data items to be inserted,
the Delete set comprising a set of data items to be deleted, and
the Verify set comprising a set of descriptions P, each description P comprising information that identifies (a) data retrieval operations performed by the client machine with respect to a particular server machine, (b) the particular server machine subject to the client data retrieval operations, and (c) a logical timestamp at the particular server machine;

delivering transaction T from the client machine to a selected server machine, the selected server machine being designated as the transaction's originator server machine;

at the transaction's originator server machine, splitting transaction T into subtransactions $T_n$ per relevant servers and executing the subtransactions using a two-phase commit protocol;

maintaining two logs of subtransactions at each server machine, a first log comprising a log of committed subtransactions (CL) and a second log comprising a log of subtransactions ready to commit (WL); and performing subtransaction verification at each server machine for each incoming subtransaction $T_n$:

(1) checking that the sets $I_n$, $D_n$, and $V_n$ do not intersect with the sets $I_k$, $D_k$, and $V_k$ for each subtransaction k in the set WL of the subtransactions ready to commit, (2) checking that each description P from the set $V_n$ does not intersect the sets $I_k$ or $D_k$ of any subtransaction k in the set CL of the committed subtransactions with the logical timestamp greater than or equal to the timestamp of P.

2. A database management system that uses the concurrency control method of claim 1.

3. The concurrency control method of claim 1, wherein the method is applied to database management systems storing facts about objects.

4. The concurrency control method of claim 1, wherein the method is applied in a semantic binary database system.

5. The concurrency control method of claim 1, wherein the method is carried out in a B-tree database structure.

6. A concurrency control method for a parallel B-tree comprising multiple server machines and multiple client machines, comprising the steps of:

incrementing a logical time at each server machine during transaction execution at the server machine;

accumulating a transaction T(I, D, V) at a client machine in three sets, an Insert set I, a Delete set D, and a Verify set V, the Insert set comprising a set of data items to be inserted,
the Delete set comprising a set of data items to be deleted, and
the Verify set comprising a set of descriptions P, each description P comprising information that identifies (a) boundaries of intervals of B-tree strings retrieved by the client machine with respect to a particular server machine, (b) the particular server machine subject to the client data retrieval operations, and (c) a logical timestamp at the particular server machine;

delivering transaction T from the client machine to a selected server machine, the selected server machine being designated as the transaction's originator server machine;

at the transaction's originator server machine, splitting transaction T into subtransactions $T_n$ per relevant servers and executing the subtransactions using a two-phase commit protocol;

maintaining two logs of subtransactions at each server machine, a first log comprising a log of committed subtransactions (CL) and a second log comprising a log of subtransactions ready to commit (WL); and performing subtransaction verification at each server machine for each incoming subtransaction $T_n$:

(1) checking that the sets In, Dn, and Vn do not intersect with the sets $I_k$, $D_k$, and $V_k$ for each subtransaction k in the set WL of the subtransactions ready to commit, (2) checking that each description P from the set $V_n$ does not intersect the sets $I_k$ or $D_k$ of any subtransaction k in the set CL of the committed subtransactions with the logical timestamp greater than or equal to the timestamp of P.

7. A query optimization method for joining or intersecting large queries in databases based on B-trees or other structures of indexed blocks of ordered records, the method comprising the steps of:

rather than fully retrieving a query result at once, allowing the user to perform a Seek operation on the query result to retrieve a record meeting a condition, prefetching and caching certain subsequent records;

applying the Seek operation to find the intersection of two large queries comprising:
retrieving a small subset of records from a first query;
using the Seek operation to retrieve matching results of a second query;
submitting the matching results of the second query to the Seek operation of the first query; and
repeating the process of applying the Seek operation until all matching records are retrieved.

8. The query optimization method in claim 7 applied to a database management systems storing facts about objects.

* * * * *